US008894907B2

(12) United States Patent
Privitera et al.

(10) Patent No.: US 8,894,907 B2
(45) Date of Patent: *Nov. 25, 2014

(54) PROCESS OF MAKING A CLEANING IMPLEMENT COMPRISING FUNCTIONALLY ACTIVE FIBERS

(75) Inventors: Marc Privitera, Walnut Creek, CA (US); David Jackson Lestage, Livermore, CA (US); Edward Jason White, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 1534 days.

This patent is subject to a terminal disclaimer.

(21) Appl. No.: 12/240,118

(22) Filed: Sep. 29, 2008

(65) Prior Publication Data

US 2010/0080993 A1 Apr. 1, 2010

(51) Int. Cl.
*D01D 7/00* (2006.01)
*D01D 5/00* (2006.01)
*D01F 1/10* (2006.01)
*D01D 5/11* (2006.01)
*B29C 47/00* (2006.01)
*B29K 105/00* (2006.01)
*B29K 105/16* (2006.01)
*B29L 31/00* (2006.01)

(52) U.S. Cl.
CPC .............. *D01D 5/0038* (2013.01); *D01F 1/103* (2013.01); *D01D 5/0076* (2013.01); *D01D 5/0023* (2013.01); *B29C 47/0004* (2013.01); *B29C 47/0014* (2013.01); *B29K 2105/0008* (2013.01); *B29K 2105/0032* (2013.01); *B29K 2105/0044* (2013.01); *B29K 2105/005* (2013.01); *B29K 2105/16* (2013.01); *B29L 2031/731* (2013.01); *D01D 5/11* (2013.01); *D01F 1/10* (2013.01)

USPC .................. 264/465; 264/211; 264/211.12

(58) Field of Classification Search
USPC .................... 264/211, 211.12, 465
See application file for complete search history.

(56) References Cited

U.S. PATENT DOCUMENTS

| | | | |
|---|---|---|---|
| 4,753,844 A | 6/1988 | Jones et al. | |
| 5,342,534 A | 8/1994 | Skrobala et al. | |
| 6,384,010 B1 | 5/2002 | Wagers | |
| 6,489,285 B2 | 12/2002 | Faber | |
| 6,716,805 B1 | 4/2004 | Sherry et al. | |
| 6,786,223 B2 | 9/2004 | Klinkhammer et al. | |
| 6,814,088 B2 | 11/2004 | Barnabas et al. | |
| 6,849,589 B2 | 2/2005 | Liu | |
| 6,936,580 B2 | 8/2005 | Sherry et al. | |
| 7,082,951 B2 | 8/2006 | Barnabas et al. | |
| 7,096,531 B2 | 8/2006 | Policicchio | |
| 2002/0065011 A1* | 5/2002 | Takeuchi et al. | 442/336 |
| 2004/0203306 A1* | 10/2004 | Grafe et al. | 442/189 |
| 2005/0121054 A1 | 6/2005 | Barnabas et al. | |
| 2006/0200232 A1* | 9/2006 | Phaneuf et al. | 264/465 X |
| 2006/0290031 A1* | 12/2006 | Jirsak et al. | 264/465 |
| 2007/0009736 A1* | 1/2007 | Chuang et al. | 428/364 |
| 2007/0237800 A1* | 10/2007 | Lahann | 424/422 |
| 2007/0269481 A1* | 11/2007 | Li et al. | 264/465 X |
| 2009/0028915 A1* | 1/2009 | Code | 424/402 |
| 2009/0208744 A1* | 8/2009 | Komura et al. | 264/465 X |

FOREIGN PATENT DOCUMENTS

WO WO-2006129844 A1 * 12/2006

* cited by examiner

*Primary Examiner* — Leo B Tentoni
(74) *Attorney, Agent, or Firm* — Erin Collins

(57) ABSTRACT

The invention comprises a method of forming functionally active fibers and substrates formed with functionally active fibers. The method includes forming a mixture of at least one polymer and at least one functional active. The mixture is then injected at a controlled flow rate into an electric field to cause the mixture to at least partially form fine fibers that have an average diameter of less than about 1000 nanometers.

15 Claims, 1 Drawing Sheet

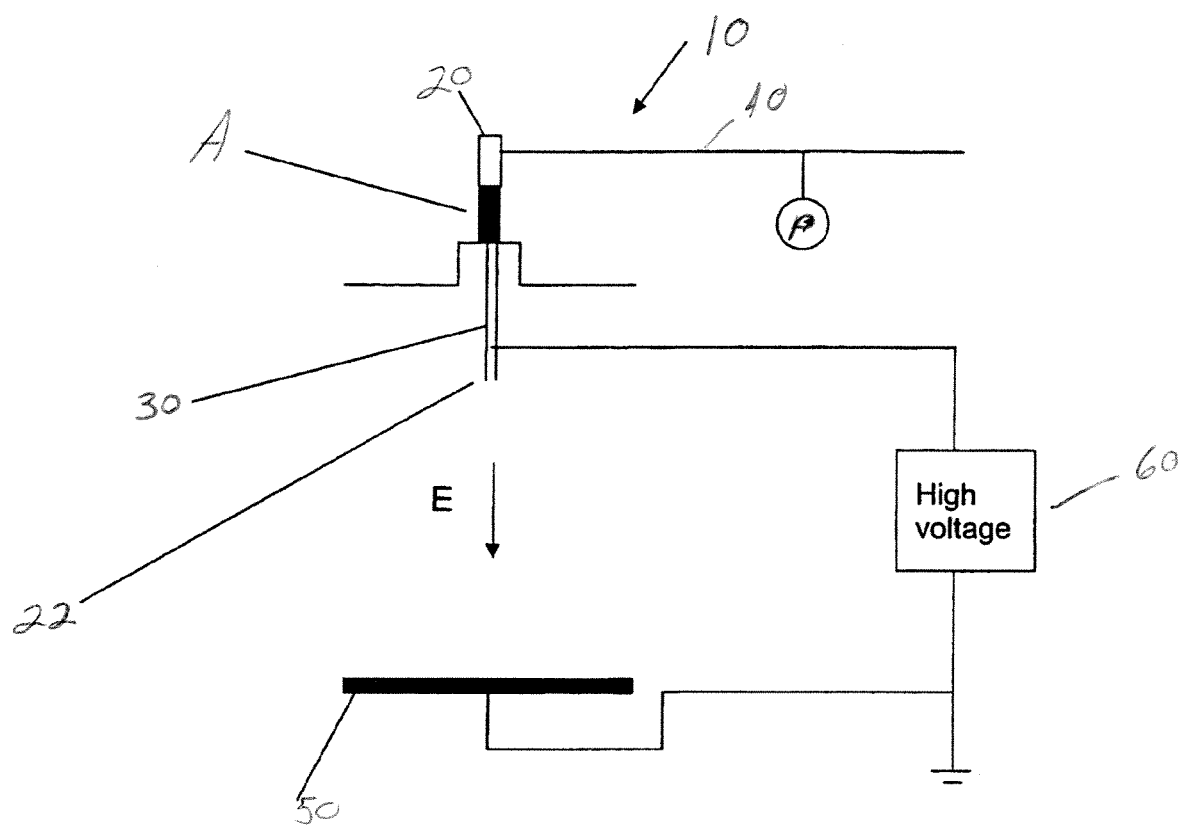
BACKGROUND ART

PROCESS OF MAKING A CLEANING IMPLEMENT COMPRISING FUNCTIONALLY ACTIVE FIBERS

The present invention is directed to electrospun fibers, and more particularly to electrospun fibers and a method of making the same which electrospun fibers include one or more functional actives.

BACKGROUND OF THE INVENTION

The practice of electrospinning fibers from a polymer is still a relatively new practice. The electrospinning process has been used to form various types of polymers into fibers having a diameter of several nanometers. These small-diameter fibers have been found to have a large specific surface area relative to fibers, thus enabling the production of fibers having a high porosity.

Several processes for forming electrospun fibers, which can be used in the present invention, are disclosed in two articles entitled "Electrospinning Process and Applications of Electrospun Fibers" by Doshi and Reneker (J. Electrostatics, 35, 151 (1995)); and "Beaded nanofibers formed during electrospinning" by H. Fong (Polymer, 40, 4585 (1999)); PCT Application Serial Nos. WO 2004/074559; WO 2005/004768; WO 2005/005696; WO 2005/005704; WO 2007/002478; U.S. Pat. Nos. 6,106,913; 6,955,775; 6,991,702; 7,229,944; and United States Patent Publication Nos. 20020100725; 2002/0173213; 2003/0215624; 2005/0224998; all of which are incorporated by reference in their entirety.

The general process for forming a nanofiber includes pumping, extruding, etc. a polymer solution through one or more small openings and subjecting the polymer solution to an electric field to form nanofibers fibers that are collected on the surface of a collector. The process results in the conversion of a polymer solution into solid polymer fibers. The process can be used to control the fiber diameter (i.e., from several nanometers to several thousand nanometers), and to control the size of the pores in the fibers to produce a porous polymer fiber.

Due to the unique properties of electrospun fibers, it is believed that such electrospun fibers could be used for various types of cleaning applications. As such, it would be advantageous to use the porous polymer fiber to form a cleaning implement. It would also be advantageous to include one or more functional actives in the porous polymer fibers so as to enhance the cleaning, sanitizing and/or disinfecting properties of the porous polymer fibers. In view of the current state of the art regarding polymer electrospun fibers, there is a need for polymer electrospun fibers that include one or more functional actives, and which polymer electrospun fibers can be used in various types of cleaning implements.

SUMMARY OF THE INVENTION

The present invention is directed to polymer electrospun fibers that include one or more functional actives. These electrospun fibers can be used in a variety of applications, all of which are included in the present invention. In one non-limiting application, the polymer electrospun fibers can be included in a variety of cleaning implements. Such cleaning implements can include, but are not limited to, sponges, brushes, foam pads, scouring pads, cleansing pads, dusters, wipes, mop heads, mop head wipes, rags, towels (e.g., paper, fabric, etc.), napkins (e.g., paper, fabric, etc.), tissues, toilet paper, etc. The polymer electrospun fibers can form the complete cleaning implement, or only form a part of the cleaning implement. When the polymer electrospun fibers only forms part of the cleaning implement, the polymer electrospun fibers can be bonded (e.g., adhesive, heat melted, lamination, etc.) to one or more other materials of the cleaning implement, interwoven with one or more other materials of the cleaning implement, needle punched to one or more other materials of the cleaning implement, mechanically connected to one or more other materials of the cleaning implement, or some combinations of such processes. As can be appreciated, other or additional arrangements can be used to incorporate the polymer electrospun fibers with one or more of the other materials of the cleaning implement. In one embodiment of the invention, the electrospun fibers are formed and joined to a carrier substrate which may be another type of cleaning material such as, but not limited to sponges, foam, woven materials, nonwoven materials, paper, brushes, scouring pads, and any other suitable cleaning implements and materials. In the embodiment of the invention of where the electrospun nanofibers are attached to a carrier substrate, it is preferred that the electrospun nanofibers comprise about 2 to 20% of the cleaning implement by weight, and more preferably about 5 to 10% by weight of the cleaning implement. Although the polymer electrospun fibers are well suited for use in various types of cleaning implements and will be described with particular reference thereto, it will be appreciated that the polymer electrospun fibers can be used in other applications (e.g., gloves, clothing, masks, filters, carpet, upholstery, tablecloths, place mats, food and/or container mats, sheets, pillow cases, quilts, blankets, wash and bath towels, etc.).

In one non-limiting aspect of the present invention, the polymer electrospun fibers are formed from one or more polymers. In one non-limiting embodiment of the present invention, at least one of the polymers used in the polymer electrospun fibers is an at least partially water-soluble polymer, an at least partially alcohol-soluble polymer, an at least partially glycerol-soluble polymer, at least glycol-soluble polymer and/or at least soluble in the monomeric form of the same polymer. In one non-limiting aspect of this embodiment, all of the polymers used in the polymer electrospun fibers are at least partially water-soluble and/or alcohol soluble polymers. In one non-limiting aspect of this embodiment, all of the polymers used in the polymer electrospun fibers are not water-soluble, but are soluble in the monomeric form of the same polymer. Some non-limiting examples include, polyacrylic acid soluablized in acrylic acid and polylactic acid soluablized in lactic acid. In another and/or alternative non-limiting aspect of this embodiment, all of the polymers used in the polymer electrospun fibers are at least partially water-soluble polymers. In yet another and/or alternative non-limiting aspect of this embodiment, all of the polymers used in the polymer electrospun fibers are water-soluble polymers. In still another and/or alternative non-limiting aspect of this embodiment, the polymer electrospun fibers are formed from a single polymer. In yet another and/or alternative non-limiting aspect of this embodiment, the polymer electrospun fibers are formed from two or more different polymers. In still yet another and/or alternative non-limiting aspect of this embodiment, all of the polymers used in the polymer electrospun fibers are alcohol-soluble polymers. In one embodiment of the invention, the fibers are formed by flash spinning, where pure solvent droplets and highly saturated polymer/solvent mixtures are decompressed through a spin orifice. As the pressurized solution is allowed to expand rapidly through the orifice, the solvent is "flashed off" instantaneously leaving behind a three-dimensional film-fibril network. The one or more polymers used in the polymer electrospun fibers can be a natural polymer and/or synthetic polymer. In another and/or alternative one non-limiting embodiment of the present invention, at least one of the polymers used in the polymer electrospun fibers is a natural polymer. In still another and/or alternative one non-limiting embodiment of the present invention, at least one of the polymers used in the polymer electrospun fibers is a synthetic polymer.

In yet another and/or alternative one non-limiting embodiment of the present invention, at least one of the polymers used in the polymer electrospun fibers includes natural gums (e.g., Agar, Alginic acid, Beta-glucan, Carrageenan, Chicle gum, Dammar gum, Gellan gum, Glucomannan, Guar gum, Gum arabic, Gum ghatti, Gum tragacanth, Karaya gum, Locust bean gum, Mastic gum, Sodium alginate, Tara gum, Xanthan gum, etc.), modified cellulose ethers (e.g., methyl cellulose, methylhydroxyethyl cellulose, butylglycidyletherhydroxyethyl cellulose, laurylgly-cidylether-hydroxyethyl cellulose, methylhydroxypropyl cellulose, hydroxyethyl cellulose, hydroxypropyl cellulose, carboxymethyl cellulose, ethylhydroxyethyl cellulose, hydroxyethyl cellulose, hydroxypropyl cellulose, ethyl cellulose, etc.), polyvinyl alcohols, partially hydrolyzed polyacrylamide, natural and modified starches (e.g., corn starch, rice starch, wheat starch, potato starch, alkaline-modified starch, bleached starch, oxidized starch, enzyme-treated starch, acetylated starch, acetylated oxidized starch, etc.), ethylene oxide polymers (e.g., poly (ethylene glycol) or poly (ethylene oxide), etc.), aliphatic polyesters, poly(glycolic acid), poly (glycolide trimethylene carbonate), poly(caprolactone glycolide), poly(lactic acid), DL-PLA, poly(caprolactone lactide), poly(lactide glycolide), poly(lactic acid ethylene glycol), poly(ethylene glycol), poly(ethylene glycol) diacrylate, poly(lactide), polyalkylene succinate, polybutylene diglycolate, polyhydroxybutyrate, polyhydroxy-valerate, poly(hydroxybutyrate-co-valerate), polyhydroxyalkaoates, poly(Valerolac-tone), polyanhydrides, poly(orthoesters), poly(anhydride-co-imide), polycarbonates (aliphatic), poly(hydroxyl-esters), polydioxanone, polyanhydrides, polyanhydride esters, polycyanoacrylates, poly(alkyl 2-cyanoacrylates), poly(amino acids), poly(phosphazenes), poly(propylene fumarate), poly (propylene fumarate-co-ethylene glycol), poly(fumarate anhydrides), fibrinogen, fibrin, gelatin, cellulose acetate, cellulose acetate butyrate, cellulose butyrate, cellulose nitrate, cellulose propionate, cellophane, alginate, polysaccharides, amylase, chitosan, collagen, polycarboxylic acids, poly(ethyl ester-co-carboxylate carbonate), poly(iminocarbonate), poly (BPA-iminocarbonate), poly(trimethylene carbonate), poly (iminocarbonate-amide) copolymers, poly(ethylene glycol), poly(ethylene oxide), poly(epsilon-caprolactone-dimethyltrimethylene carbonate), poly(ester amide), poly(amino acids), poly(alkylene oxalates), poly(alkylcarbonate), poly (adipic anhydride), dextrans, polyketals, polydihydropyrans, polydepsipeptides, poly (acrylic acid), poly(glycolic acid), poly(lactic acid), poly (propane sulfonics), poly (vinyl acetate), poly (vinyl alcohol), poly (diallyldimethylammonium chlorides), poly (sulfonated polysterenics), poly (vinyl methyl ether), poly (vinyl ethyl ether), poly (ethylene oxide), poly (propylene oxide), p-AMPs, carboxyvinyl polymer, and any blends of the above listed polymers. As can be appreciated, other or additional polymers can be used in the present invention.

In another and/or alternative non-limiting aspect of the present invention, the one or more polymers used to form the polymer electrospun fibers are mixed with one or more functional actives prior to forming the polymer electrospun fibers so as to form electrospun fibers that facilitate in cleaning, sanitizing, disinfecting, and/or sterilizing a surface. As used herein, "functional active" refers to a substance, other than a surfactant, which reacts or interacts with a surface to clean, sanitize, disinfect, sterilize, bleach, remove stains, etc. such surface. As used herein, the term "disinfect" shall mean the elimination of many or all pathogenic microorganisms on surfaces with the exception of bacterial endospores. As used herein, the term "sanitize" shall mean the reduction of contaminants in the inanimate environment to levels considered safe according to public health ordinance, or that reduces the bacterial population by significant numbers where public health requirements have not been established. An at least 99% reduction in bacterial population within a 24 hour time period is deemed "significant." As used herein, the term "sterilize" shall mean the substantially complete elimination or destruction of all forms of microbial life and which is authorized under the applicable regulatory laws to make legal claims as a "Sterilant" or to have sterilizing properties or qualities. Many different functional actives can be added to the one or more polymers. In one non-limiting embodiment of the invention, the polymer electrospun fibers of the present invention are formed from a single functional active. In another and/or alternative non-limiting embodiment of the invention, the polymer electrospun fibers of the present invention are formed from two or more different functional actives. In still another and/or alternative non-limiting embodiment of the invention, one or more of the functional actives that can be mixed with the one or more polymers include, but are not limited to, biguanide compounds, boric acid and borates, chlorinated hydrocarbons, organometallics, halogen-releasing compounds, mercury compounds, metallic salts, metal ions (e.g. $Ag^+$, $Cu^+$, etc.), pine oil, organic sulfur compounds, iodine compounds, quats, silver nitrate, quaternary phosphate compounds, phenolics, bleaching agents (e.g., peracids, perborates, percarbonates, chlorine-generating substances [e.g., chloroisocyanurates hypohalite sources], sodium hypochlorite, calcium hypochlorite, hydrogen peroxide, and/or sources of peroxides), organic and inorganic acids, aldehydes, ketones, alcohols (such alcohols are not polymers and/or are different from the primary solvent for the polymer or functional active), ethers, esters, organic bases, alkali metal hydroxides, carbonates, terpenes, and/or commercially formulated liquid cleaners. As can be appreciated, other or additional functional actives can be used. In one non-limiting aspect of this embodiment, one or more of the functional actives that can be mixed with one or more polymers can include 1,3-dichloro-5-ethyl-5-methylhydan-toin, 1,3-dichloro-5,5-dimethylhydantoin, 2-butoxyethanol, 3-bromo-1-chloro-5,5-dimethyl-hydantoin, alkyl ($C_{12-16}$) dimethyl benzyl ammonium chlorides, alkyl ($C_{12-16}$) dimethylbenzyl n-octyl bicycloheptene dicarboximide, alkyl ($C_{12-14}$) dimethylethyl-benzyl ammonium chlorides, alkyl alcohol ethoxylates, alkylbenzenesulfonate, alkylbenzene sulfonic acid, alkyl polyglucoside, ammonium chloride, alkyl trimethyl ammonium bromide, ammonium hydroxide, amine oxide, amyl acetate, benzyl chloro phenol, boric acid, bromochloro-5,5-dimethylhydantoin, chlorhexidine digluconate, chlorothalonil, chlorhexidine gluconate, citric acid, cocoamidopropyl betaine, d-tran allethrin, dicamba, dichloro meta xylenol, didecyl dimethyl ammonium chloride, diethanolamine, diethyl ether, diethylene glycol monoethyl ether, dimethyl ether, dimethyl salt, dimethyltetradecylamine oxide, estenvalerate, ethoxylated alcohol, ethyl acetates, ethylene glycol monobutyl ether, ethylene glycol n-hexyl ether, glycolic acid, glutaraldehyde, hydrogen fluoride, hydrogen peroxide, isopropanol, isopropylamine salt of glyphosphate, lambda cyhalothrin, linear alcohol ethoxylates, mecoprop-p dimethylamine salt, lauramine oxide, lauryldimethylamine oxide, methyl ethyl ether, methyl acetate, monoethanolamine, myristamine oxide, n-alkyl ($C_{12-18}$) dimethyl benzyl ammonium chlorides, n-alkyl($C_{12-14}$) dimethyl ethylbenzyl ammonium chlorides, n-alkyl ($C_{12-16}$) dimethylbenzyl n-octyl bicycloheptene dicarboximides, n-alkyl dimethyl aryl ammonium chloride, n-butyl ether, n-propoxy-propanol, nonylphenol ethoxylates, ortho phenyl phenol, oxalic acid, para chloro meta xylenol, polydimethylsiloxane, poly(hexamethylenebiguanide) hydrochloride, polyhexamethylene biguanide, poly-L-lysine, polyvinyl pyrrolidone, propyl acetate, propylene glycol, propylene glycol monobutyl ether, quaternary fatty amine ethoxylate, salts of tall oil acid, sodium alkyl aryl sulfonate, sodium alkylbenzene-sulfonate, sodium carbonate, sodium citrate, sodium hydroxide, sodium hypochlorite, sodium lauryl sulfate, sodium lauryl ether sulfate, sodium metasilicate, sodium olefin sulfonate, sodium percarbonate, sodium xylene sulfonate, t-butyl ether, tralomethrin, triethanolamine, and/or tween 20 (polyoxyethylene sorbitan monolaurate). In another and/or alternative non-limiting embodiment of the invention, many different types of commercial cleaners can be used as the source of one or more functional actives. Non-limiting examples of commercial cleaners that can be used include, but are not limited to, Lime Away™ by Reckitt Benkeiser, Clean Shower Daily Soap Scum and Mildew Remover™ by Arm & Hammer Company, Sno Bol Toilet Bowl Cleaner™ by Church and Dwight Company, Kaboom Shower, Tub and Tile Cleaner™, Mr. Clean All Purpose Cleaner™ by Procter & Gamble Co., Simple Green All Purpose Cleaner™ by Sunshine Makers, Grease Lightning™ by A&M Cleaning Products, Top Job™ by Changing Paradigm, LLC, Johnson Wax Bathroom and Bowl Cleaner™ by S.C. Johnson, and Johnson Wax Mildew Remover™ by S.C. Johnson. In addition, the following commercial products by The Clorox Company could also be used as a source of one or more functional actives, namely Formula 409® All Purpose Cleaner Antibacterial Kitchen Lemon Fresh, Formula 409® Antibacterial All Purpose Cleaner, Formula 409® Glass & Surface Cleaner, Formula 409® Natural Stone Cleaner, Anywhere Clorox® Anywhere Hard Surface™ Daily Sanitizing Spray, Armor All—STP Armor All® Auto Glass Cleaner, Armor All® Car Wash Concentrate, Armor All® Multi-Purpose Cleaner, Armor All® PowerWash Gel, Armor All® Tire Foam®, Armor All® Triple Action Wheel Cleaner, Armor All® Wheel Cleaner, STP® One Step Tire Care, STP® Son of a Gun® One Step Tire Care, Clorox® Bleach Pen™ Gel, Clorox® High Efficiency Bleach Cleaner, Clorox® Outdoor Bleach Cleaner, Clorox® Regular Bleach, Clorox® Scented Liquid Bleach, Clorox® Splash-Less Liquid Gel Bleach, Clorox® Ultimate Care™ Premium Bleach, Clorox® Bath Wand System, Clorox® Bathroom Cleaner with Teflon® Surface Protector, Clorox® Bathroom Cleaner with Teflon® Surface Protector, Clorox® Disinfecting Bathroom Cleaner, Clorox® Clean-Up® Cleaner with Bleach, Clorox® Clean-Up® Cleaner with Bleach Spray, Clorox® Disinfecting Floor & Surface Cleaner, Clorox® Disinfecting Kitchen Cleaner, Clorox 2® Chlorine Free Bleach for Colors, Clorox 2® for Colors Free & Clear Chlorine-Free Bleach, Ultra Clorox 2® Color Safe Bleach, Clorox Commercial Solutions® Green Works™ Natural All Purpose Cleaner, Clorox Commercial Solutions® Green Works™ Natural Bathroom Cleaner, Clorox Commercial Solutions® Green Works™ Natural Dilutable Cleaner, Clorox Commercial Solutions® Clorox® Bleach, Clorox Commercial Solutions® Clorox® Bleach Toilet Bowl Cleaner, Clorox Commercial Solutions® Clorox® Clean-Up® Disinfectant Cleaner with Bleach, Clorox Commercial Solutions® Clorox® Germicidal Spray, Clorox Commercial Solutions® Clorox® Quat Sanitizer & Disinfectant, Clorox Commercial Solutions® Formula 409® Cleaner Degreaser Disinfectant, Clorox Commercial Solutions® Formula 409® Heavy-Duty Degreaser, Clorox Commercial Solutions® Ultra Clorox® Germicidal Bleach, Clorox Commercial Solutions® Ultra Clorox® Germicidal Bleach, Commercial Solutions Formula 409® Orange Cleaner Degreaser, Commercial Solutions Lemon Fresh! Pine-Sol All Purpose Cleaner, Commercial Solutions Liquid-Plumr Heavy Duty Clog Opener, Commercial Solutions Orange Energy Pine-Sol All Purpose Cleaner, Commercial Solutions Pine-Sol Brand Cleaner, Commercial Solutions SOS Pot & Pan Detergent, Commercial Solutions Tilex Disinfects Instant Mildew Remover, Commercial Solutions Tilex Soap Scum Remover & Disinfectant, Formula 409® NQF, Green Works™ Natural All Purpose Cleaner, Green Works™ Natural Bathroom Cleaner, Green Works™ Natural Dilutable Cleaner, Green Works™ Natural Glass and Surface Cleaner, Green Works™ Natural Toilet Bowl Cleaner, Lestoil® Concentrated Heavy Duty Cleaner, Liquid-Plumr®, Professional Strength Liquid-Plumr® Clog Remover, Professional Strength Liquid-Plumr® Gel, Professional Strength Liquid-Plumr® Kitchen Clog Remover with Fresh Scent, Clorox® Oxi-Magic™ Multi-Purpose Stain Remover, Clorox® Oxi Magic™ Multi-Purpose Stain Remover, Fresh Scent Pine-Sol® Spray & Mop Floor Cleaner, Lavender Clean™ Pine-Sol® All Purpose Cleaner, Lemon Fresh Pine-Sol® Advanced Floor Cleaner, Lemon Fresh Pine-Sol® All Purpose Cleaner, Lemon Fresh! Pine-Sol® Cleaner & Antibacterial Spray, Lemon Fresh! Pine-Sol® Quick Floor Cleaner, Mountain Energy Pine-Sol® All Purpose Cleaner, Orange Energy® Pine-Sol® All Purpose Cleaner, Original Pine-Sol® Brand Cleaner, Sparkling Wave Pine-Sol® All Purpose Cleaner, Wild Flower Blast Pine-Sol® All Purpose Cleaner, Clorox® ReadyMop® Advanced Floor Cleaner, Clorox® ReadyMop® Advanced Floor Cleaner—Orange Energy, Clorox® Scooba™ Hard Floor Cleaner, SOS® All Purpose Cleaner—Lemon Scent, SOS® Heavy Duty All Purpose Cleaner with Bleach, SOS® Heavy Duty Glass & Surface Cleaner, SOS® Heavy Duty Multi-Purpose Cleaner—Lemon Scent, SOS® Multi-Surface Cleaner—Fresh Scent, SOS® Multi-Surface Cleaner—Lavender Scent, SOS® Multi-Surface Cleaner—Lemon Scent, Clorox® Stain Out®, Fresh Scent Tilex® Fresh Shower Daily Shower Cleaner, Lemon Fresh Tilex® Mildew Remover, Professional Strength Tilex® Instant Mildew Stain Remover, Tilex® Instant Mildew Remover, Tilex® Mildew Root® Penetrator & Remover, Tilex® Mold Killer Mold & Mildew Remover, Tilex® Mold & Mildew Remover, Tilex® Soap Scum Remover, Tilex® Soap Scum Remover & Disinfectant, Clorox® Automatic Toilet Bowl Cleaner, Clorox® Automatic Toilet Bowl Cleaner, Clorox® Bleach Toilet Bowl Cleaner Fresh Scent, Clorox® Bleach Toilet Bowl Cleaner Rain Clean, Clorox® Blue Automatic Toilet Bowl Cleaner, Clorox® Blue Automatic Toilet Bowl Cleaner with Teflon® Surface Protector, Clorox® Disinfecting Toilet Bowl with Bleach, Clorox® Dual Action Toilet Bowl Cleaner, Clorox® Toilet Bowl Cleaner—for Tough Stains, Clorox® Toilet Bowl Cleaner—With Bleach—Fresh Scent, Clorox® Toilet Bowl Cleaner—With Bleach—Rain Clean, Clorox® Toilet Bowl Cleaner with Teflon® Surface Protector. As can be appreciated, many other or additional commercial cleaners can be mixed with the one or more polymers to form the polymer electrospun fibers of the present invention. As can also be appreciated, two or more commercial cleaners can be mixed with one or more polymers to form the polymer electrospun fibers of the present invention. As can further be appreciated, one or more commercial cleaners can be combined with one or more functional actives from a non-commercial cleaner source and be mixed with one or more polymers to form the polymer electrospun fibers of the present invention. Also, it will be appreciated that the one or more functional actives which can be mixed with one or more polymers to form the polymer electrospun fibers of the present invention can be from a non-commercial cleaner source. In a further and/or alternative non-limiting embodiment of the invention, the polymer electrospun fibers can be formed from a mixture of one or more natural and/or synthetic water-soluble bleach compatible polymers (e.g., polymers of acrylic acids, polymers of propane sulfonics, polymers of diallydimethylammonium chlorides, etc.) and one or more bleaching actives (e.g, peracids, perborates, percarbonates, chlorine-generating substances [e.g., chloroisocyanurates hypohalite sources], sodium hypochlorite, calcium hypochlorite, hydrogen peroxide, and/or sources of peroxides, etc.). In still a further and/or alternative non-limiting embodiment of the invention, the polymer electrospun fibers can be formed from a mixture of one or more water-soluble natural and/or synthetic polymers and one or more water-soluble quat and/or biguanide functional additives. In yet a further and/or alternative non-limiting embodiment of the invention, the polymer electrospun fibers can be formed from a mixture of one or more water-soluble natural and/or synthetic polymers and one or more water-soluble $Ag^+$ and/or $Cu^{+2}$ functional additives.

In still another and/or alternative non-limiting aspect of the present invention, the one or more polymers and the one or more functional actives used to form the polymer electrospun fibers should be able to form a generally stable and homogeneous mixture. It has been found that when a generally stable and homogeneous mixture is not formed prior to the mixture being subjected to an electric field, few, if any, fibers are formed. As defined herein, a generally stable and homogeneous mixture is a polymer and functional active mixture that maintains its homogenous form for at least about 1 minute after being mixed for at least about 10 minutes. In one non-limiting embodiment of the invention, one or more polymers and one or more functional actives are selected such that a generally homogenous mixture is formed for at least about 5 minutes after being mixed for at least about 10 minutes. In another and/or alternative non-limiting embodiment of the invention, one or more polymers and one or more functional actives are selected such that a generally homogenous mixture is formed for at least about 15 minutes after being mixed for at least about 10 minutes. In still another and/or alternative non-limiting embodiment of the invention, one or more polymers and one or more functional actives are selected such that a generally homogenous mixture is formed for at least about 30 minutes after being mixed for at least about 10 minutes. In yet another and/or alternative non-limiting embodiment of the invention, one or more polymers and one or more functional actives are selected such that a generally homogenous mixture is formed for at least about 60 minutes after being mixed for at least about 10 minutes. In another and/or alternative non-limiting embodiment of the invention, polymers that are compatible with the mixed functional active are selected to facilitate in forming a generally homogeneous mixture. In still another and/or alternative non-limiting aspect of the present invention, the one or more polymers and the one or more functional actives can be at least partially reacted or bonded together either covalently, ionically, or electro-statically prior to forming the polymer electrospun fibers; however, this is not required. As such, as defined in the present invention, a single compound that includes a polymer and a functional active that is bonded to the polymer is considered a mixture of at least one polymer and at least one functional active when the single compound is at least partially dissolved in a solvent. As can be appreciated, additional polymers and/or functional actives could be mixed with a single compound that includes a polymer and functional active, wherein such mixture can be used in forming the polymer electrospun fibers; however, this is not required.

In one embodiment the electrospun fiber is a homogenous mixture of at least one polymer and at least one functional active and it forms a homogenous electrospun fiber where the functional active is thoroughly mixed together with the polymer. In an alternative embodiment of the invention, the electrospun fiber may be a bicomponent fiber where there are at least two polymers where at least one polymer is mixed together with a functional active to form one of the following geometries for bicomponent fibers: side by side, sheath/core, segmented pie, striped, islands in the sea, and any other suitable arrangement. Similarly, in another embodiment the electrospun fiber may be a multicomponent fiber with two or more polymers and multiple functional active which maybe formed in any of the above-mentioned geometric formations for suitable for bicomponent fibers.

In one specific embodiment of the invention, the electrospun fiber comprises a sheath polymeric component which is not water soluble and a polymeric core which is water soluble with a functional active. In this embodiment, the core of the fiber is water-soluble so that when the fibers are exposed to water it forms a liquid core with a functional active that can be readily released to the surface to be cleaned. In an alternative embodiment, the functional active and polymer are in the sheath of the bicomponent fiber and the core of the fiber may be another polymer which can be selected to enhance the strength and continuity of the fiber which enabling the active to be released from the sheath of the fiber while keeping the integrity of the fiber intact. In a further embodiment of the invention, a contaminant maybe mixed with the polymer forming the sheath of the bicomponent fiber which makes the sheath of the fiber weak and easily breakable so that the functional active and polymer core maybe easily exposed to water to release the functional actives in the core of the fiber.

In yet another and/or alternative non-limiting aspect of the present invention, at least one of the polymers used to form polymer electrospun fibers degrades or dissolves at a slower rate than at least one of the functional actives used to form the polymer electrospun fibers; however, this is not required. It is believed that an extended time of release of the one or more functional actives can be achieved during the use of the polymer electrospun fibers when at least one of the polymers used to form polymer electrospun fibers degrades or dissolves at a slower rate than at least one of the functional actives. As such, the usable life of the polymer electrospun fibers can be extended by this selection of polymer and functional active. In one non-limiting embodiment of the invention, all of the polymers in the polymer electrospun fibers degrade or dissolve at a slower rate than at least one of the functional actives in the polymer electrospun fibers. In another and/or alternative non-limiting embodiment of the invention, all of the polymers in the polymer electrospun fibers degrade or dissolve at a slower rate than all of the functional actives in the polymer electrospun fibers. In still another and/or alternative non-limiting embodiment of the invention, the time ratio that at least one of the polymers in the polymer electrospun fibers degrades or dissolves relative to at least one of the functional actives in the polymer electrospun fibers is at least about 1.05:1. As such, in this particular embodiment, if the functional active dissolved in 10 minutes, the polymer would dissolve in a time no earlier than 10.5 minutes. In yet another and/or alternative non-limiting embodiment of the invention, the time ratio that at least one of the polymers in the polymer electrospun fibers degrades or dissolves relative to at least one of the functional actives in the polymer electrospun fibers is at least about 1.25:1. In yet another and/or alternative non-limiting embodiment of the invention, the time ratio that at least one of the polymers in the polymer electrospun fibers degrades or dissolves relative to at least one of the functional actives in the polymer electrospun fibers is at least about 1.5:1. In still yet another and/or alternative non-limiting embodiment of the invention, the time ratio that at least one of the polymers in the polymer electrospun fibers degrades or dissolves relative to at least one of the functional actives in the polymer electrospun fibers is at least about 2:1. In another and/or alternative non-limiting embodiment of the invention, the time ratio that at least one of the polymers in the polymer electrospun fibers degrades or dissolves relative to at least one of the functional actives in the polymer electrospun fibers is about 2-10:1. As can be appreciated, other time ratios for dissolving rate of the functional active relative to the polymer can be used. In still another and/or alternative non-limiting embodiment of the invention, at least one of the polymers in the polymer electrospun fibers and at least one of the functional actives in the polymer electrospun fibers are designed to dissolve when exposed to water and/or alcohol. In one aspect of this embodiment, all of the polymers in the polymer electrospun fibers and all of the functional actives in the polymer electrospun fibers are designed to dissolve when exposed to water and/or alcohol.

In another and/or alternative non-limiting aspect of the present invention, when the polymer electrospun fibers are formed from one or more polymers that include a functional active bonded to the polymer, the functional active on the polymer is generally designed to disassociate from the polymer at a rate that is faster than the dissolving of the polymer when the electrospun fibers are exposed to water and/or an alcohol; however, this is not required. By selecting a polymer that dissolves at a slower rate than the rate at which the functional active disassociates from the polymer, the integrity of the electrospun fibers can be maintained while the functional active is controllably and/or uncontrollably released from the electrospun fibers. In one non-limiting embodiment of the invention, the time ratio that at least one of the polymers in the polymer electrospun fibers begins to dissolve relative to the time at least one of the functional actives disassociates from the polymer in the polymer electrospun fibers is at least about 2:1. As such, in this particular embodiment, if the functional active begins disassociating from the polymer in 5 seconds, the polymer would begin to dissolve in a time no earlier than 10 seconds. In another and/or alternative non-limiting embodiment of the invention, the time ratio that at least one of the polymers in the polymer electrospun fibers begins to dissolve relative to the time at least one of the functional actives disassociates from the polymer in the polymer electrospun fibers is at least about 5:1. In still another and/or alternative non-limiting embodiment of the invention, the time ratio that at least one of the polymers in the polymer electrospun fibers begins to dissolve relative to the time at least one of the functional actives disassociates from the polymer in the polymer electrospun fibers is at least about 20:1. In yet another and/or alternative non-limiting embodiment of the invention, the time ratio that at least one of the polymers in the polymer electrospun fibers begins to dissolve relative to the time at least one of the functional actives disassociates from the polymer in the polymer electrospun fibers is at least about 100:1. As can be appreciated, other time ratios for at least one of the polymers in the polymer electrospun fibers to begin dissolving relative to the time at least one of the functional actives disassociates from the polymer in the polymer electrospun fibers can be used.

In still yet another and/or alternative non-limiting aspect of the present invention, when the polymer and the functional active are different compounds or components, the weight percent of the polymers in the polymer electrospun fibers is generally greater than the weight percent of the functional actives in the polymer electrospun fibers. For purposes of this invention, the amount of solvent remaining in the formed polymer electrospun fibers is not considered when determining the weight ratio of the polymers to the functional additives in polymer electrospun fibers. In one non-limiting embodiment of the invention, the weight ratio of the polymers of the polymer electrospun fibers to the functional actives of the polymer electrospun fibers is at least about 1.5:1. In another and/or alternative non-limiting embodiment of the invention, the weight ratio of the polymers of the polymer electrospun fibers to the functional actives of the polymer electrospun fibers is at least about 2:1. In still another non-limiting embodiment of the invention, the weight ratio of the polymers of the polymer electrospun fibers to the functional actives of the polymer electrospun fibers is at least about 5:1. In yet another non-limiting embodiment of the invention, the weight ratio of the polymers of the polymer electrospun fibers to the functional actives of the polymer electrospun fibers is at least about 10:1. In yet another non-limiting embodiment of the invention, the weight ratio of the polymers of the polymer electrospun fibers to the functional actives of the polymer electrospun fibers is less than about 10000:1. As can be appreciated, other weight ratios of the polymers to the functional actives in the polymer electrospun fibers can be used.

In another and/or alternative non-limiting aspect of the present invention, the viscosity of the mixture of the at least one polymer and the at least one functional active prior to the mixture being subjected to an electric field is at least about 500 cps at 25° C. It has been found that viscosities that are lower than about 500 cps at 25° C. will not properly form polymer electrospun fibers, or not form any polymer electrospun fibers. The viscosity of the mixture of the at least one polymer and the at least one functional active prior to the mixture being subjected to an electric field is also less than about 100000 cps at 25° C. It has been found that viscosities that are greater than about 100000 cps at 25° C. also will not properly form polymer electrospun fibers, or not form any polymer electrospun fibers. In one non-limiting embodiment of the invention, the viscosity of the mixture of the at least one polymer and the at least one functional active prior to the mixture being subjected to an electric field is at least about 750 cps at 25° C. In another and/or alternative non-limiting embodiment of the invention, the viscosity of the mixture of the at least one polymer and the at least one functional active prior to the mixture being subjected to an electric field is at least about 1000 cps at 25° C. In still another and/or alternative non-limiting embodiment of the invention, the viscosity of the mixture of the at least one polymer and the at least one functional active prior to the mixture being subjected to an electric field is no greater than about 25000 cps at 25° C. In still another and/or alternative non-limiting embodiment of the invention, the viscosity of the mixture of the at least one polymer and the at least one functional active prior to the mixture being subjected to an electric field is no greater than about 10000 cps at 25° C. In yet another and/or alternative non-limiting embodiment of the invention, the viscosity of the mixture of the at least one polymer and the at least one functional active prior to the mixture being subjected to an electric field is about 1500-8000 cps at 25° C. In still yet another and/or alternative non-limiting embodiment of the invention, the viscosity of the mixture of the at least one polymer and the at least one functional active prior to the mixture being subjected to an electric field is about 2000-7000 cps at 25° C. As can be appreciated, other viscosities for the mixture can be used.

In still another and/or alternative non-limiting aspect of the present invention, the process parameters regarding flowrate of the polymer-functional additive mixture, strength of electric field and distance mixture travels through electric field are controlled to obtain the polymer electrospun fibers. It has been found that by controlling these parameters, a desired thin fiber-structured polymer material can be formed in accordance with the present invention. In one non-limiting embodiment of the invention, the flowrate of the mixture the polymer-functional additive mixture through each nozzle is at least about 0.1 microliter per minute and less than about 100 microliters per minute. It has been found that faster or slower flowrates for the mixture through each nozzle will produce little, if any, polymer electrospun fibers. In one non-limiting aspect of this embodiment, the flowrate of the mixture the polymer-functional additive mixture through each nozzle is at least about 5 microliters per minute. In another and/or alternative non-limiting aspect of this embodiment, the flowrate of the mixture the polymer-functional additive mixture through each nozzle is at least about 7 microliters per minute. In still another and/or alternative non-limiting aspect of this embodiment, the flowrate of the mixture the polymer-functional additive mixture through each nozzle is at least about 10 microliters per minute. In yet another and/or alternative non-limiting aspect of this embodiment, the flowrate of the mixture the polymer-functional additive mixture through each nozzle is no greater that about 60 microliters per minute. In still yet another and/or alternative non-limiting aspect of this embodiment, the flowrate of the mixture the polymer-functional additive mixture through each nozzle is no greater that about 40 microliters per minute. In another and/or alternative non-limiting aspect of this embodiment, the flowrate of the mixture the polymer-functional additive mixture through each nozzle is no greater that about 30 microliters per minute. As can be appreciated, other or additional flowrates for the mixture can be used. In another and/or alternative non-limiting embodiment of the invention, the strength of the electric field through which the mixture travels as the mixture is transformed into polymer electrospun fibers is at least about 0.5 kV and less than about 200 kV. It has been found that an electric field that is less than 0.5 kV will not form polymer electrospun fibers. Likewise, it has been found that an electric field that is 200 kV or more also will not form polymer electrospun fibers. In one non-limiting aspect of this embodiment, the electric field through which the mixture travels as the mixture is transformed into polymer electrospun fibers is at least about 1 kV. In another and/or alternative non-limiting aspect of this embodiment, the electric field through which the mixture travels as the mixture is transformed into polymer electrospun fibers is at least about 2 kV. In still another and/or alternative non-limiting aspect of this embodiment, the electric field through which the mixture travels as the mixture is transformed into polymer electrospun fibers is up to about 100 kV. In yet another and/or alternative non-limiting aspect of this embodiment, the electric field through which the mixture travels as the mixture is transformed into polymer electrospun fibers is about 2-20 kV. In still yet another and/or alternative non-limiting aspect of this embodiment, the electric field through which the mixture travels as the mixture is transformed into polymer electrospun fibers is about 2-12 kV. In another and/or alternative non-limiting aspect of this embodiment, the electric field through which the mixture travels as the mixture is transformed into polymer electrospun fibers is about 2-10 kV. As can be appreciated, other or additional values for the electric field can be used. In still another and/or alternative non-limiting embodiment of the invention, the distance that the mixture of polymer and functional active travels through the electric field during the transformation from a liquid mixture to polymer electrospun fibers is at least about 1 cm and typically less than about 100 cm. It has been found that distances of travel of less than 1 cm are insufficient to form polymer electrospun fibers. Distances of travel of greater than 100 cm are not required since the polymer electrospun fibers have been fully created long before traveling of such distances. In one non-limiting aspect of this embodiment, the distance that the mixture of polymer and functional active travels through the electric field during the transformation from a liquid mixture to polymer electrospun fibers is at least about 2 cm. In another non-limiting aspect of this embodiment, the distance that the mixture of polymer and functional active travels through the electric field during the transformation from a liquid mixture to polymer electrospun fibers is up to about 40 cm. In still another non-limiting aspect of this embodiment, the distance that the mixture of polymer and functional active travels through the electric field during the transformation from a liquid mixture to polymer electrospun fibers is up to about 20 cm. In yet another non-limiting aspect of this embodiment, the distance that the mixture of polymer and functional active travels through the electric field during the transformation from a liquid mixture to polymer electrospun fibers is about 2-10 cm. As can be appreciated, other or additional distances of travel can be used.

In yet another and/or alternative non-limiting aspect of the present invention, the polymer electrospun fibers are nanofibers. As defined herein, a nanofiber is a fiber that has an average diameter of no more than 1000 nanometers. In one non-limiting embodiment of the invention, the polymer electrospun fibers have an average diameter of no more than about 500 nanometers. In another and/or alternative non-limiting embodiment of the invention, the polymer electrospun fibers have an average diameter of no more than about 200 nanometers. In still another and/or alternative non-limiting embodiment of the invention, the polymer electrospun fibers have an average diameter of no more than about 100 nanometers. In yet another and/or alternative non-limiting embodiment of the invention, the polymer electrospun fibers have an average diameter of at least about 0.1 nanometers. In still yet another and/or alternative non-limiting embodiment of the invention, the polymer electrospun fibers have an average diameter of at least about 0.5 nanometers. In another and/or alternative non-limiting embodiment of the invention, the polymer electrospun fibers have an average diameter of at least about 1 nanometers.

In still yet another and/or alternative non-limiting aspect of the present invention, the polymer electrospun fibers can include one or more additives; however, this is not required. Such one or more additives, when used, can include, but are not limited to, abrasive materials, anti-corrosion materials, anti-redeposition materials, anti-static agents, anti-sticking agents, buffering and pH adjusting agents, chelating agents, colorants and/or dyes, defoamers, elastomers, enzymes, filler materials, foamers, fragrances or perfumes, heat generating materials, hydrotropes, sequestration agents, softening agents, soil release agents, solubilizing materials, stabilizers, surfactants, sudsing control agents, thickeners, wetting agents, and/or UV protectors. As can be appreciated, other or additional additives can be used. In one embodiment, the buffering and pH adjusting agents, when used, include, but are not limited to, organic acids, mineral acids, alkali metal and alkaline earth salts of silicate, metasilicate, polysilicate, borate, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and/or 2-amino-2-methylpropanol. In another and/or alternative non-limiting embodiment, the solubilizing materials, when used, include, but are not limited to, hydrotropes (e.g., water soluble salts of low molecular weight organic acids such as the sodium and/or potassium salts of xylene sulfonic acid). In still another and/or alternative non-limiting embodiment, thickeners, when used, include, but are not limited to, calcium carbonate, aluminum oxide, and/or clays. In yet another and/or alternative non-limiting embodiment, defoamers, when used, include, but are not limited to, silicones, aminosilicones, silicone blends, and/or silicone/hydrocarbon blends. In a further and/or alternative non-limiting embodiment, enzymes, when used, include, but are not limited to, lipases, proteases, amylases, cellulases, and/or peroxidases, and/or hydrotropes such as xylene sulfonates and/or toluene sulfonates. In still a further and/or alternative non-limiting embodiment, preservatives, when used, include, but are not limited to, mildewstat or bacteriostat, methyl, ethyl and propyl parabens, short chain organic acids (e.g., acetic, lactic and/or glycolic acids), bisguanidine compounds (e.g., Dantagard and/or Glydant) and/or short chain alcohols (e.g., ethanol and/or IPA). In another and/or alternative non-limiting embodiment of the invention, the corrosion inhibitors, when used, include, but are not limited to, sodium silicate, sodium disilicate, and/or sodium metasilicate. In another and/or alternative non-limiting embodiment of the invention, the chelant, when used, can include, but is not limited to, ethylenediamine-N,N'-disuccinic acid (EDDS) or the alkali metal, alkaline earth metal, ammonium, and/or substituted ammonium salts thereof. In another and/or alternative non-limiting embodiment of the invention, the suds suppressors, when used, include, but are not limited to, silicones (e.g., alkylated polysiloxane) and/or silica-silicone mixtures (e.g., silica aerogels, xerogels, hydrophobic silicas of various types, etc.). In another and/or alternative non-limiting embodiment of the invention, the antiredeposition and soil suspension agents, when used, include, but are not limited to, cellulose derivatives (e.g., methylcellulose, carboxymethylcellulose, hydroxyethylcellulose, homopolymers of acrylic acid, copolymers of maleic acid and acrylic acid, etc.). In still another and/or alternative non-limiting embodiment of the invention, the soil release agents, when used, include, but are not limited to, copolymers or terpolymers of terephthalic acid with ethylene glycol and/or propylene glycol, ethoxylated/propoxylated polyamines, modified polyesters (e.g., dimethyl terephtalate, dimethyl sulfoisophtalate, ethylene glycol and 1-2 propane diol, etc.). In another and/or alternative non-limiting embodiment of the invention, the heat generating materials, when used, include, but are not limited to, magnesium sulfate, calcium oxide, lithium chloride, magnesium chloride, sodium sulfate, aluminum oxide, aluminum sulfate, aluminum fluoride, aluminum nitrate, lithium nitrate, sodium borate, beryllium sulfate, sodium phosphate, calcium chloride, zinc sulfate, aluminum chloride, zinc chloride, zeolites, etc. In still another and/or alternative non-limiting embodiment of the invention, the foaming agent, when used, include, but are not limited to, alkyl poly glucoside, polyxyethylene and/or polyoxy propylene type of nonionic surfactant, etc.

It is one non-limiting object of the present invention to form polymer electrospun fibers from a mixture that includes at least one polymer and at least one function additive.

It is another and/or alternative object of the present invention to form polymer electrospun fibers from a mixture that includes at least one water-soluble and/or alcohol soluble polymer and at least one water-soluble and/or alcohol soluble functional additive.

It is still another and/or alternative object of the present invention to form polymer electrospun fibers having a high surface area to weight ratio.

These and other objects and advantages will become apparent to those skilled in the art upon reading and following the description of the invention taken together with the accompanied drawings.

We claim:

1. A method of forming a cleaning implement containing functionally active fibers comprising:
    a) forming a mixture of at least one polymer and at least one functional active, said at least one polymer is at least partially water-soluble, at least partially ethanol-soluble, at least partially glycerol-soluble, or combinations thereof, said at least one polymer including a polymer selected from the group consisting of natural gums, alginates, chitosan, modified cellulose ethers, poly (acrylic acids), poly (propane sulfonics), poly (vinyl acetate), modified starch, poly (vinyl alcohol), poly (diallyldimethylammonium chlorides), poly (sulfonated polysterenics), poly (vinyl methyl ether), poly (vinyl ethyl ether), poly (ethylene oxide), poly (propylene oxide), p-AMPs, carboxyvinyl polymer, or mixtures thereof, said at least one functional active including a substance reacts or interacts with a surface to clean, sanitize, disinfect, sterilize, bleach, remove stains, or combination thereof;
    b) injecting said mixture at a controlled flow rate;
    c) ejecting said mixture and simultaneously exposing said the ejected mixture to an electric field having a potential of over about 1.0 kV to cause said ejected mixture to form fine fibers, said fibers having an average diameter of less than about 1000 nanometers; and,
    d) collecting said fibers on a collector; and
    e) forming said fibers into a cleaning implement;
    wherein said cleaning implement consists of: functionally active fibers having a diameter of less than about 1000 nanometers.

2. The method as defined in claim 1, wherein said electric field has a potential of about 2-100 kV.

3. The method as defined in claim 1, wherein said mixture is injected through at least one nozzle, said control flow rate through each nozzle is about 0.1-40 micro-liters per minute.

4. The method as defined in claim 3, wherein said mixture is injected through at least one nozzle, said control flow rate through each nozzle is about 10-30 micro-liters per minute.

5. The method as defined in claim 1, wherein a distance said ejected mixture travels through said electric field is about 1-100 cm.

6. The method as defined in claim 5, wherein a distance said ejected mixture travels through said electric field is about 2-10 cm.

7. The method as defined in claim 1, wherein said mixture has a viscosity of about 100-100000 cps at 25° C.

8. The method as defined in claim 1, wherein said at least one polymer includes poly (acrylic acids), poly (propane sulfonics), poly (diallyldimethylammonium chlorides), or mixtures thereof.

9. The method as defined in claim 1, wherein said at least one polymer includes poly (acrylic acids).

10. The method as defined in claim 1, wherein said at least one functional active includes an additive selected from the group consisting of organic acids, inorganic acids, aldehydes, ketones, simple straight chain mono-functional alcohols, mono-functional ethers, esters, organic bases, alkali metal hydroxides, carbonates, silicates, oxidizing agents, bleaching agents, terpenes, commercially formulated liquid cleaners, quaternary ammonium compounds, biguanides, p-AMPS, poly-L-lysine, methyl alcohol, ethyl alcohol, propyl alcohol, butyl alcohol, other higher molecular weight straight chain mono-functional alcohols, dimethyl ether, methyl ethyl ether, diethyl ether, other higher molecular weight mono-functional ethers, methyl acetate, ethyl acetates, propyl acetate, amyl acetate, other higher molecular weight esters, or mixtures thereof.

11. The method as defined in claim 1, wherein said at least one functional active includes 1,3-dichloro-5-ethyl-5-methylhydantoin, 1,3-dichloro-5,5-dimethylhydantoin, 2-butoxyethanol, 3-bromo-1-chloro-5,5-dimethyl-hydantoin, alkyl (C12-16) dimethyl benzyl ammonium chlorides, alkyl (C12-16) dimethylbenzyl n-octyl bicycloheptene dicarboximide, alkyl (C12-14) dimethylethylbenzyl ammonium chlorides, alkyl alcohol ethoxylates, alkylbenzenesulfonate, alkylbenzene sulfonic acid, alkyl polyglucoside, ammonium chloride, alkyl trimethyl ammonium bromide, ammonium hydroxide, amine oxide, amyl acetate, benzyl chloro phenol, boric acid, bromochloro-5,5-dimethylhydantoin, chlorhexidine digluconate, chlorothalonil, chlorhexidine gluconate, citric acid, cocoamidopropyl betaine, d-tran allethrin, dicamba, dichloro meta xylenol, didecyl dimethyl ammonium chloride, diethanol-amine, diethyl ether, diethylene glycol monoethyl ether, dimethyl ether, dimethyl salt, dimethyltetradecylamine oxide, estenvalerate, ethoxylated alcohol, ethyl acetates, ethylene glycol monobutyl ether, ethylene glycol n-hexyl ether, glycolic acid, glutaraldehyde, hydrogen fluoride, hydrogen peroxide, isopropanol, isopropylamine salt of glyphosphate, lambda cyhalothrin, linear alcohol ethoxylates, mecoprop-p dimethylamine salt, lauramine oxide, lauryldimethylamine oxide, methyl ethyl ether, methyl acetate, monoethanolamine, myristamine oxide, n-alkyl (C12-18) dimethyl benzyl ammonium chlorides, n-alkyl(C12-14) dimethyl ethylbenzyl ammonium chlorides, n-alkyl (C12-16) dimethylbenzyl n-octyl bicycloheptene dicarboximides, n-alkyl dimethyl aryl ammonium chloride, n-butyl ether, n-propoxypropanol, nonylphenol ethoxylates, ortho phenyl phenol, oxalic acid, para chloro meta xylenol, polydimethylsiloxane, poly(hexamethylenebiguanide) hydrochloride, polyhexa-methylene biguanide, poly-L-lysine, polyvinyl pyrrolidone, propyl acetate, propylene glycol, propylene glycol monobutyl ether, quaternary fatty amine ethoxylate, salts of tall oil acid, sodium alkyl aryl sulfonate, sodium alkylbenzenesulfonate, sodium carbonate, sodium citrate, sodium hydroxide, sodium hypochlorite, sodium lauryl sulfate, sodium lauryl ether sulfate, sodium metasilicate, sodium olefin sulfonate,sodium percarbonate, sodium xylene sulfonate, t-butyl ether, tralomethrin, triethanolamine, and/or tween 20 (polyoxyethylene sorbitan monolaurate), or mixtures thereof.

12. The method as defined in claim 11, wherein said at least one functional active includes a bleaching agent, quat, biguanide, metallic salts, or mixtures thereof, said bleaching agent including a compound selected from the group consisting of peroxide, CaOCl2, NaOCl, or mixtures thereof, said metallic salts including a salt selected from the group consisting of silver metal salts, copper metal salts, or mixtures thereof 13. The method as defined in claim 1, wherein a total amount of said functional active in said mixture is up to about 20 weight percent of said mixture.

14. A method of forming a cleaning implement containing functionally active fibers comprising:
a) forming a mixture of at least polymer and at least one functional active; said at least polymer and at least one functional active forming a stable and homogenous phase; said at least one polymer is not water-soluble nor at least partially water-soluble, at least partially ethanol-soluble, at least partially glycerol-soluble, or combinations thereof; said at least one polymer includes a polymer selected from the group consisting of poly (acrylic acids), chitosan, xanthan gum, alginates, poly (vinyl acetate), modified starch, poly (vinyl alcohol), poly (diallyldimethylammonium chlorides), p-AMPs, 2-Propenoic acid homopolymer, Carbopol 940™, agar, poly (ethylene oxide), or mixtures thereof; said at least one functional active includes wherein said at least one functional active includes 1,3-dichloro-5-ethyl-5-methylhydantoin, 1,3-dichloro-5,5-dimethyl-hydantoin, 2-butoxyethanol, 3-bromo-1-chloro-5,5-dimethyl-hydantoin, alkyl (C12-16) dimethyl benzyl ammonium chlorides, alkyl (C12-16) dimethylbenzyl n-octyl bicycloheptene dicarboximide, alkyl (C12-14) dimethylethylbenzyl ammonium chlorides, alkyl alcohol ethoxylates, alkylbenzenesulfonate, alkylbenzene sulfonic acid, alkyl polyglucoside, ammonium chloride, alkyl trimethyl ammonium bromide, ammonium hydroxide, amine oxide, amyl acetate, benzyl chloro phenol, boric acid, bromochloro-5,5-dimethylhydantoin, chlorhexidine digluconate, chlorothalonil, chlorhexidine gluconate, citric acid, cocoamidopropyl betaine, d-tran allethrin, dicamba, dichloro meta xylenol, didecyl dimethyl ammonium chloride, diethanolamine, diethyl ether, diethylene glycol monoethyl ether, dimethyl ether, dimethyl salt, dimethyltetradecylamine oxide, estenvalerate, ethoxylated alcohol, ethyl acetates, ethylene glycol monobutyl ether, ethylene glycol n-hexyl ether, glycolic acid, glutaraldehyde, hydrogen fluoride, hydrogen peroxide, isopropanol, isopropylamine salt of glyphosphate, lambda cyhalothrin, linear alcohol ethoxylates, mecoprop-p dimethylamine salt, lauramine oxide, lauryldimethylamine oxide, methyl ethyl ether, methyl acetate, monoethanolamine, myristamine oxide, n-alkyl (C12-18) dimethyl benzyl ammonium chlorides, n-alkyl(C12-14) dimethyl ethylbenzyl ammonium chlorides, n-alkyl (C12-16) dimethylbenzyl n-octyl bicycloheptene dicarboximides, n-alkyl dimethyl aryl ammonium chloride, n-butyl ether, n-propoxypropanol, nonylphenol ethoxylates, ortho phenyl phenol, oxalic acid, para chloro meta xylenol, polydimethylsiloxane, poly(hexamethylenebiguanide) hydrochloride, polyhexamethylene biguanide, poly-L-lysine, polyvinyl pyrrolidone, propyl acetate, propylene glycol, propylene glycol monobutyl ether, quaternary fatty amine ethoxylate, salts of tall oil acid, sodium alkyl aryl sulfonate, sodium alkylbenzenesulfonate, sodium carbonate, sodium citrate, sodium hydroxide, sodium hypochlorite, sodium lauryl sulfate, sodium lauryl ether sulfate, sodium metasilicate, sodium olefin sulfonate,sodium percarbonate, sodium xylene sulfonate, t-butyl ether, tralomethrin, triethanolamine, and/or tween 20 (polyoxyethylene sorbitan monolaurate), or mixtures thereof; a total amount of said functional active in said mixture is up to about 20 weight percent of said mixture; said mixture has having a viscosity of about 1000-10000 cps at 25° C.;

b) injecting said mixture through a nozzle at a control flow rate of about 10-30 micro-liters per minute;

c) ejecting said mixture and simultaneously exposing said the ejected mixture to an electric field having a potential of about 2-12 kV to cause said ejected mixture to at least partially form fine fibers, said fibers having an average diameter of less than about 1000 nanometers, said mixture traveling a distance of about 2-10 cm when exposed to said electric field; and, d) collecting said fibers on a collector;

e) forming a cleaning a cleaning implement consisting of: said fibers; and f) dissolving said fibers in water and/or alcohol to release said functional active to a surface to be cleaned, sanitized and/or disinfected.

15. The method as defined in claim 14, wherein the surface to be cleaned is a hard surface.

* * * * *